(12) United States Patent
Lee

(10) Patent No.: US 12,343,866 B2
(45) Date of Patent: Jul. 1, 2025

(54) SYSTEMS AND METHODS FOR AUTOMATED BUILDING CONSTRUCTION

(71) Applicant: David Lee, Manti, UT (US)

(72) Inventor: David Lee, Manti, UT (US)

(73) Assignee: David C. Lee, or His Successors in Their Capacity as Trustees, in Trust of the David C. Lee Living Trust Originally Dated April 25, 2017, Manti, UT (US)

(*) Notice: Subject to any disclaimer, the term of this patent is extended or adjusted under 35 U.S.C. 154(b) by 0 days.

(21) Appl. No.: 18/237,363

(22) Filed: Aug. 23, 2023

(65) Prior Publication Data

US 2024/0009831 A1   Jan. 11, 2024

Related U.S. Application Data

(63) Continuation of application No. 17/459,405, filed on Aug. 27, 2021, now Pat. No. 11,772,258.

(60) Provisional application No. 63/071,461, filed on Aug. 28, 2020.

(51) Int. Cl.
   *E04B 2/00* (2006.01)
   *B25J 5/04* (2006.01)
   *E04B 1/35* (2006.01)

(52) U.S. Cl.
   CPC ......... *B25J 5/04* (2013.01); *E04B 2001/3588* (2013.01)

(58) Field of Classification Search
   CPC .................. B25J 5/04; E04B 2001/3588
   See application file for complete search history.

(56) References Cited

U.S. PATENT DOCUMENTS 8,973,768 B1 *  3/2015  Jung ............... B25J 9/026
                                              414/626

FOREIGN PATENT DOCUMENTS

| JP | H0791067 A | * | 5/1995 | |
| WO | WO-2005070657 A1 | * | 8/2005 | .......... B25J 19/0025 |
| WO | WO-2007101475 A1 | * | 9/2007 | ............ B25J 18/025 |
| WO | WO-2016018908 A1 | * | 2/2016 | .............. B25J 11/00 |

* cited by examiner

*Primary Examiner* — Randell J Krug
(74) *Attorney, Agent, or Firm* — P. G. Scott Born; FisherBroyles, LLP

(57) ABSTRACT

The disclosed systems for automated building construction may include upright supports, a support platform coupled to and vertically movable relative to the upright supports, and a bridge platform coupled to and horizontally movable along the support platform. A track may be mounted on the bridge platform, and a robotic arm may be coupled to and movable along the track. The robotic arm may be configured to retrieve structural insulated panels and to position the structural insulated panels to construct at least a portion of a building. Various other related systems and methods are also disclosed.

17 Claims, 6 Drawing Sheets

SYSTEMS AND METHODS FOR AUTOMATED BUILDING CONSTRUCTION

PRIORITY CLAIM

This application claims is a continuation of and claims priority to U.S. patent application Ser. No. 17/459,405 filed Aug. 27, 2021, which application claims priority to U.S. Provisional Patent Application Ser. No. 63/071,461 filed Aug. 28, 2020 the contents of which are hereby incorporated by reference in their entirety as if fully set forth herein.

COPYRIGHT NOTICE

This disclosure is protected under United States and/or International Copyright Laws.© 2023 LEE MACHINE, INC. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

BACKGROUND

In recent years, certain automated building construction techniques been developed for the construction industry. For example, there are systems that extrude cement in layers in a predetermined pattern to form walls of a building. These systems are essentially large three-dimensional printers. However, these conventional systems are often limited in the types, shapes, and sizes of buildings that may be constructed.

BRIEF DESCRIPTION OF THE DRAWING FIGURES

DETAILED DESCRIPTION

The present disclosure includes systems and methods for automated building construction. The disclosed systems may include a support platform that may be configured to move vertically along upright supports and a bridge platform that may be configured to move horizontally along the support platform. A track may be mounted on at least the bridge platform. A robotic arm may be coupled to and movable along the track. The robotic arm may be configured to retrieve structural insulated panels ("SIPs") and to position the structural insulated panels to construct at least a portion of a building.

Figure 1:
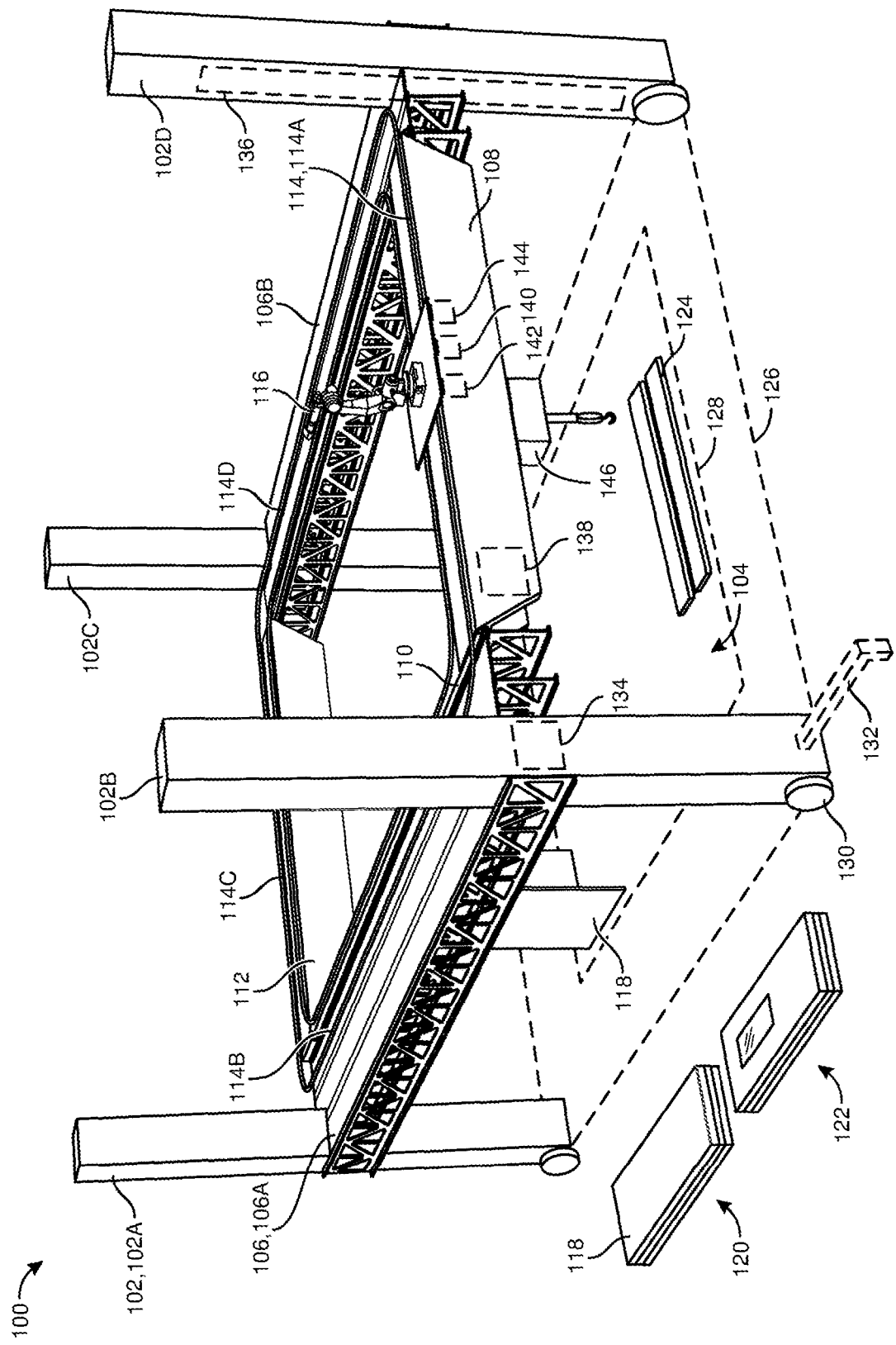
FIG. 1 is a perspective view of a system for automated building construction, according to at least one embodiment of the present disclosure.
Figure 2:
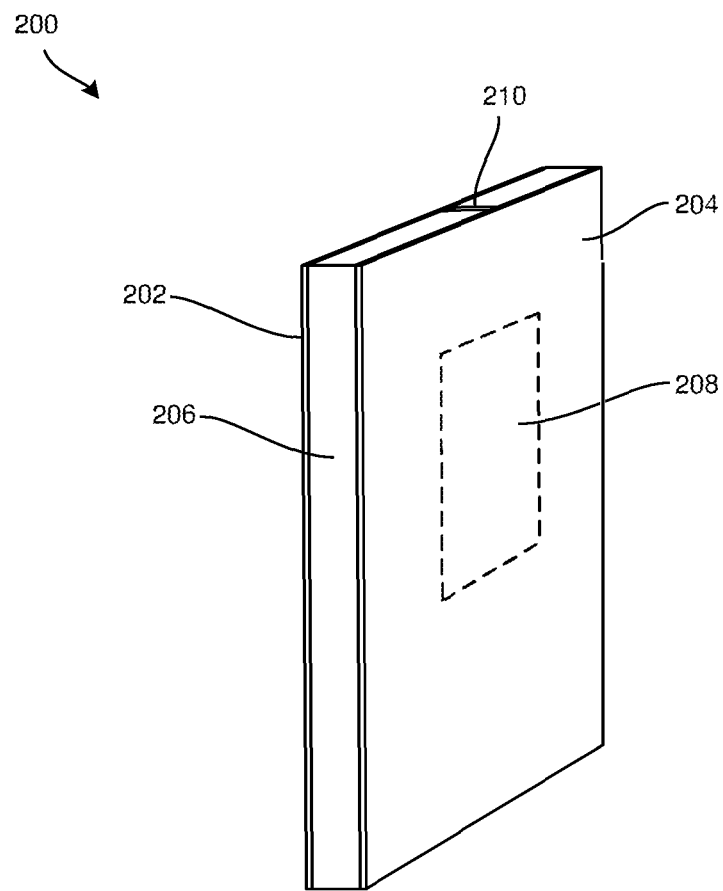
FIG. 2 is a perspective view of a structural insulated panel, according to at least one embodiment of the present disclosure.
Figure 3:
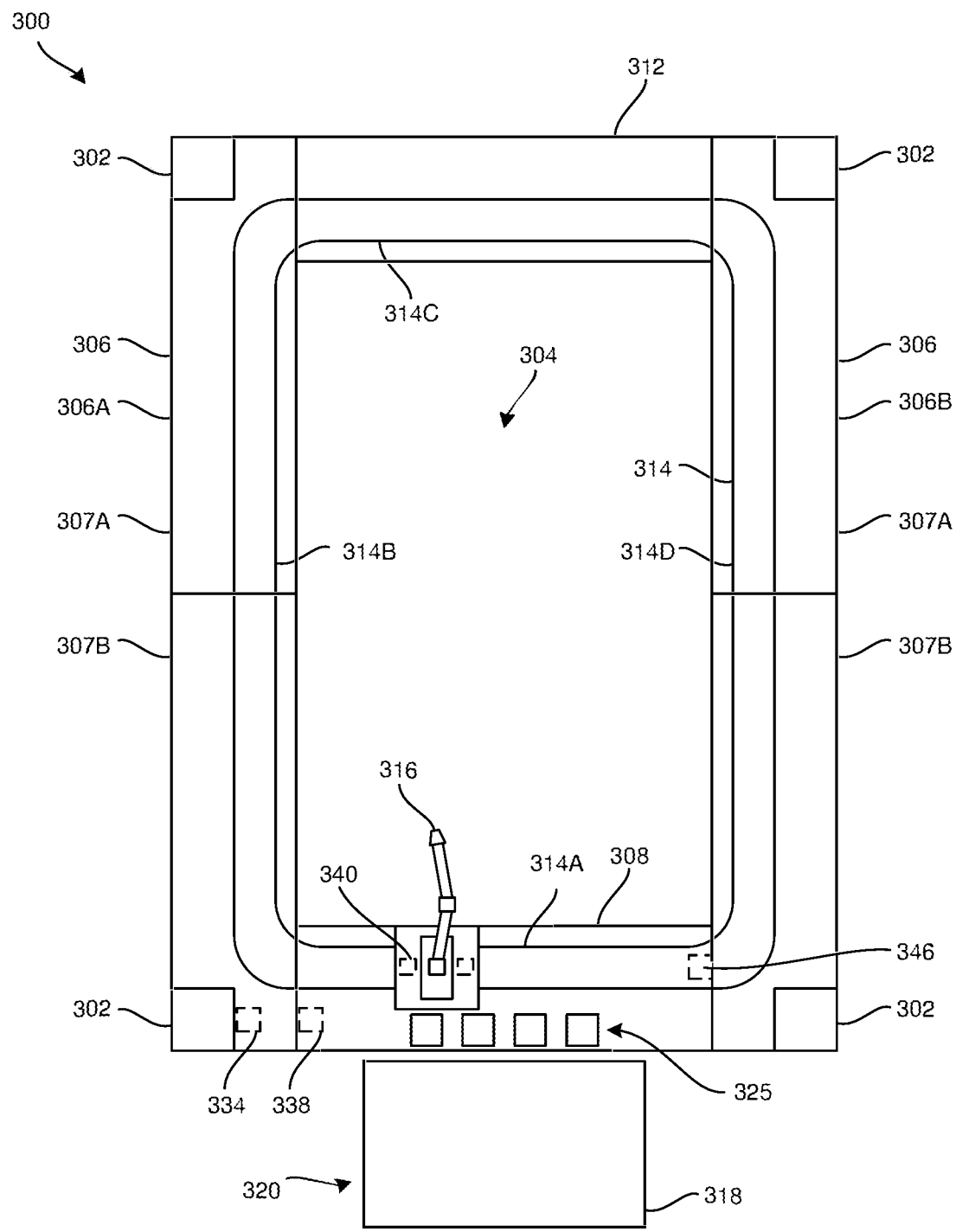
FIG. 3 is a plan view of a system for automated building construction in an initial stage, according to at least one embodiment of the present disclosure.
Figure 4:
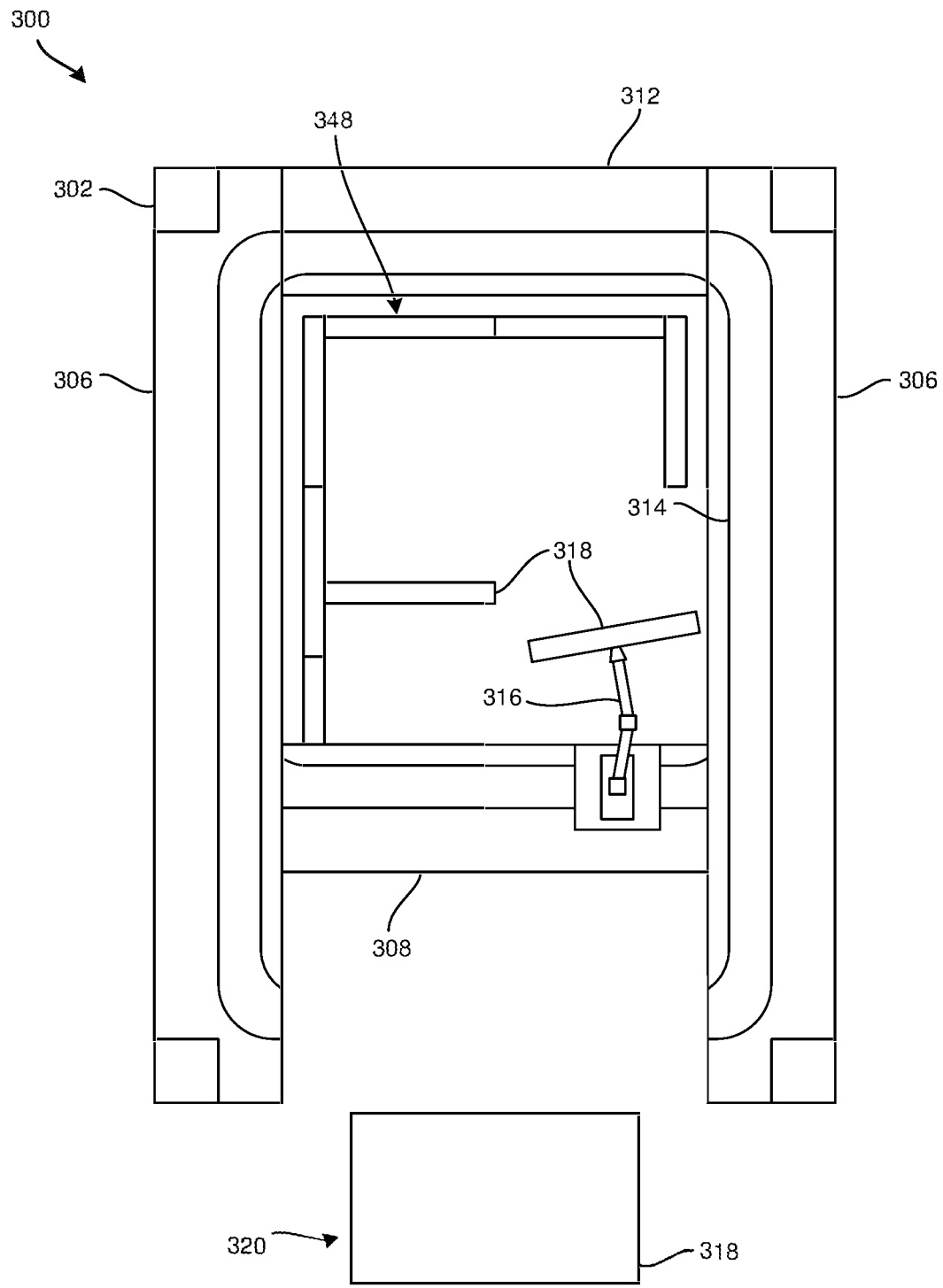
FIG. 4 is a plan view of the system of FIG. 3 in a first active position, according to at least one embodiment of the present disclosure.
Figure 5:
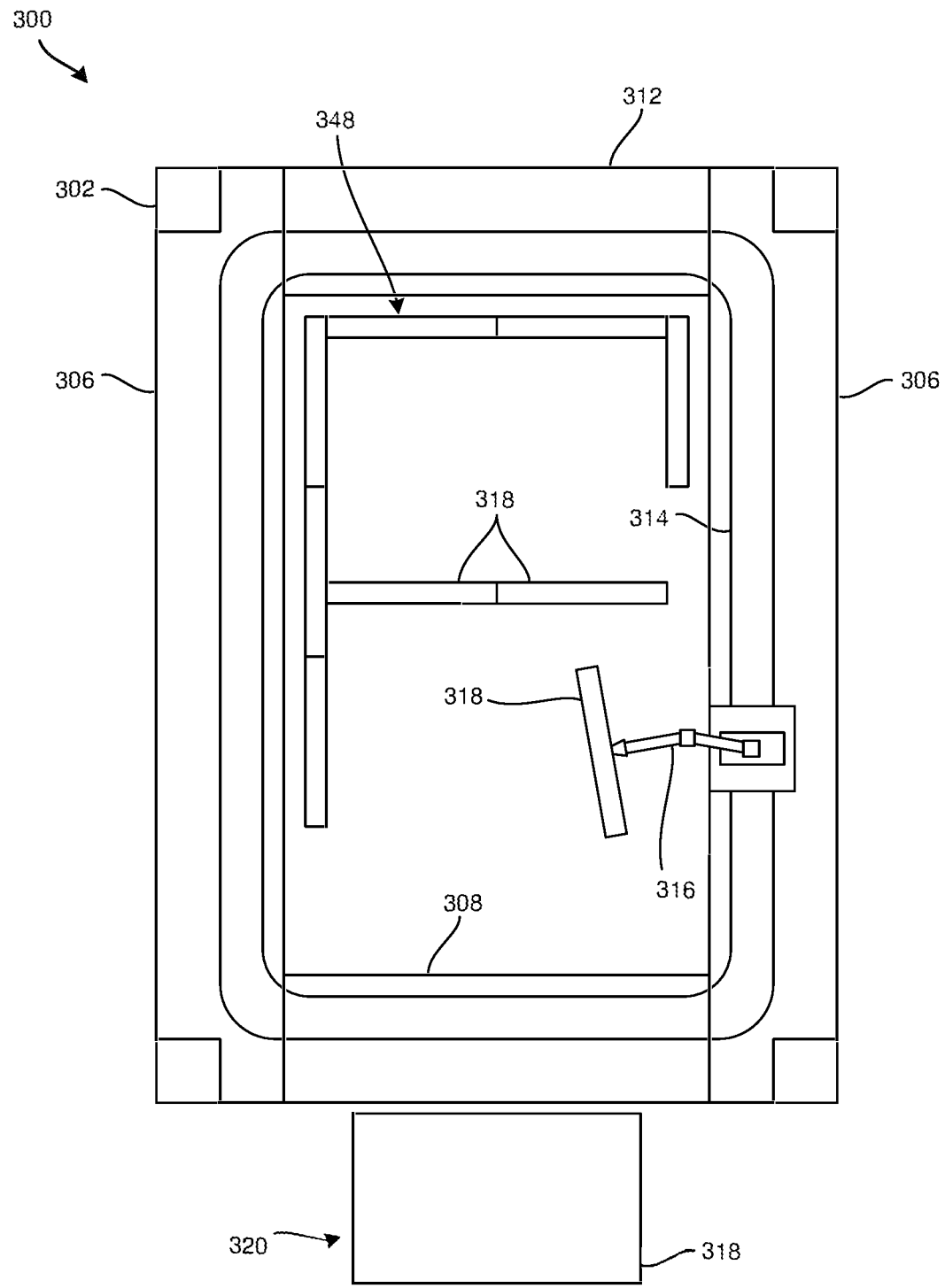
FIG. 5 is a plan view of the system of FIG. 3 in a second active position, according to at least one embodiment of the present disclosure.
Figure 6:
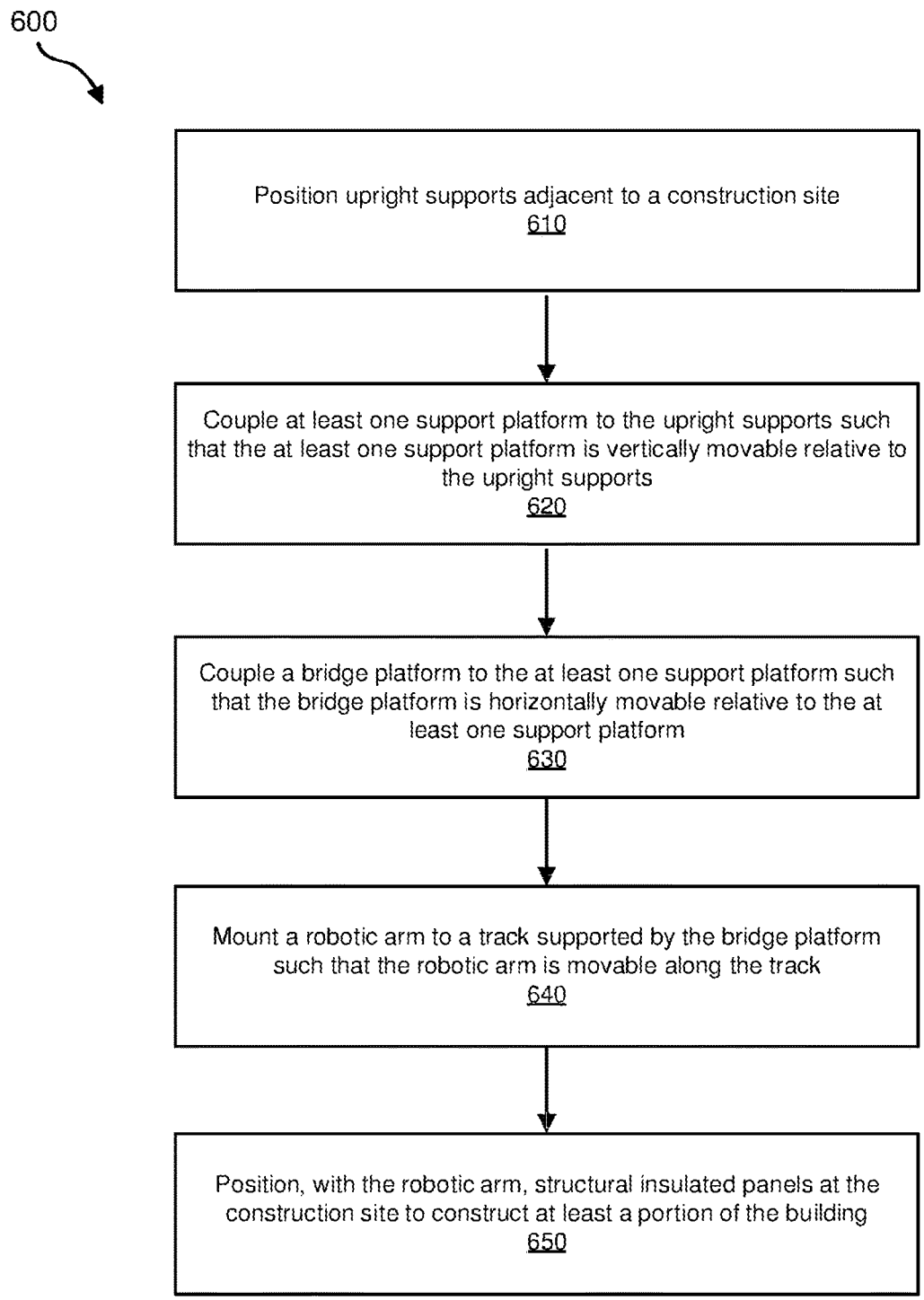
FIG. 6 is a flow diagram illustrating a method of automated building construction, according to at least one embodiment of the present disclosure.

The following will provide, with reference to FIG. 1, detailed descriptions of a system for automated building construction. With reference to FIG. 2, the following will provide detailed descriptions of an example structural insulated panel that may be used for automated building construction. With reference to FIGS. 3-5, the following will provide detailed descriptions of a system for automated building construction at various stages of construction. With reference to FIG. 6, the following will provide detailed descriptions of an example method of constructing a building.

FIG. 1 is a perspective view of a system 100 for automated building construction, according to at least one embodiment of the present disclosure. The system 100 may include upright supports 102 positioned adjacent to a construction site 104 where at least a portion of a building (e.g., a house, a shed, a classroom, etc.) is to be constructed. For example, four upright supports 102A, 102B, 102C, and 102D may be positioned at respective corners of the construction site 104. At least one support platform 106 may be coupled to the upright supports 102. For example, a first support platform 106A may be positioned to extend between the first upright support 102A and the second upright support 102B, and a second support platform 106B may be positioned to extend between the third upright support 102C and the fourth upright support 102D. The support platform(s) 106 may be vertically movable relative to the upright supports 102.

In some examples, relational terms, such as "first," "second," etc., may be used for clarity and convenience in understanding the disclosure and accompanying drawings and do not connote or depend on any specific preference, orientation, or order, except where the context clearly indicates otherwise.

The system 100 may also include a bridge platform 108 coupled to the support platform(s) 106. The bridge platform 108 may be horizontally movable along the support platform(s) 106, such as along guiderails 110 of the support platform(s) 106. For example, the bridge platform 108 may be suspended between the first support platform 106A and the second support platform 106B.

Optionally, a cross platform 112 may also be coupled to the support platform(s) 106. In some embodiments, the cross platform 112 may be stationary relative to the support platform(s) 106. In additional embodiments, the cross platform 112 may also be horizontally movable along the support platform(s) 106, such as along the guiderails 110.

A track 114 may be mounted on at least the bridge platform 108. In some embodiments, as shown in FIG. 1, the track 114 may also be mounted on the support platform(s) 106 and the cross platform 112. The track 114 may form a loop when the bridge platform 108 and/or the cross platform 112 are in an initial, home position (as illustrated in FIG. 1). For example, a first track segment 114A may be mounted on the bridge platform 108, a second track segment 114B may be mounted on the first support platform 106A, a third track segment 114C may be mounted on the cross platform 112, and a fourth track segment 114D may be mounted on the second support platform 106B. The track 114 may be a monorail track or a dual rail track.

As illustrated in FIG. 1, the track 114 may be mounted to a top of the bridge platform 108, support platforms 106, and cross platform 112. However, the present disclosure is not limited to this arrangement. In additional embodiments, the track 114 may be mounted on a side (e.g., the inside) or a bottom of the platforms 108, 106, 112.

The system 100 may also include a robotic arm 116, which may be coupled to and movable along the track 114. The robotic arm 116 may be configured to retrieve building materials including structural insulated panels 118 ("SIPs"), such as from a stack 120 of the SIPs 118, and to position the SIPs 118 to construct at least a portion of a building. The robotic arm 116 may also be configured to retrieve additional building materials, such as doors, window sections 122, structural supports 124, screws, bolts, nails, brackets, trusses, roof sections, etc. These building materials may be positioned for retrieval by the robotic arm 116 outside of an outer periphery 126 defined by the upright supports 102, within a building envelope 128 in which the building is to be constructed, on the support platform(s) 106, on the bridge platform 108, on the cross platform 112, or any combination thereof.

In some examples, the robotic arm 116 may be a six-axis robotic arm 116, which may be capable of moving an end effector thereof in six degrees of freedom (e.g., x-direction, y-direction, z-direction, yaw, pitch, and roll). The end effector of the robotic arm 116 may include elements and features for constructing the building. For example, the end effector may include a suction element, grasper, or magnet for lifting the SIPs 118 and/or other building materials. The end effector may include a screwdriver head for driving bolts or screws for joining portions of the building under construction. The end effector may include a nail gun for driving nails for joining portions of the building under construction.

In some examples, the construction site 104 may initially include a preformed foundation (e.g., cement foundation, wooden foundation, stone foundation, etc.) upon which the building is to be constructed.

The system 100 may be mobile and configured for assembly at any suitable construction site 104. For example, the upright supports 102 may include wheels 130 or similar elements that may be used for moving the upright supports 102 into a position adjacent to the construction site 104. When the upright supports 102 are in their proper position, the upright supports 102 may be secured in place. For example, one or more outriggers 132 may be deployed to secure the upright supports to a ground surface at the construction site 104. The upright supports 102 may be or include an I-beam, an upright truss beam, and/or any other suitable structure. Similarly, the support platform(s) 106, bridge platform 108, and/or the cross platform 112 may be or include an I-beam, a support truss beam, and/or any other suitable structure. In some examples, the upright supports 102, support platform(s) 106, bridge platform 108, and/or cross platform 112 may respectively include multiple segments that are coupled to each other in an end-to-end fashion. Accordingly, the system 100 may be modular and adaptable to construct buildings of different sizes.

The system 100 may include various mechanisms for moving the various components thereof relative to each other, as well as for controlling and sensing such movement. For example, a lifting mechanism 134 may be employed to lift the support platform(s) 106 vertically along the upright supports 102, such as along lift rails 136 mounted to the upright supports 102. The lifting mechanism 134 may be positioned on the upright supports 102, on the support platform(s) 106, or a combination thereof. A bridge movement mechanism 138 may be employed to move the bridge platform 108 horizontally along the support platform(s) 106. A drive mechanism 140 may be employed to move the robotic arm 116 along the track 114. A stop mechanism 142 may be employed to lock the robotic arm 116 in position along the track 114. A position sensor 144 may be employed to locate the robotic arm 116 relative to the bridge platform 108, support platform(s) 106, cross platform 112, the track 114, the stack 120 of SIPs 118 or other building material, a ground surface, portions of the building to be constructed, etc.

In some embodiments, the system 100 may also include a hoist 146 that may be positioned to lift building components (e.g., SIPs 118, structural supports 124, etc.), such as to move the building components within the building envelope 128. For example, the hoist 146 may be positioned on a lower side of the bridge platform 108, such that the hoist 146 can be moved into a desired location over the building envelope 128. The hoist 146 may be movable along a length of the bridge platform 108.

The lifting mechanism 134, bridge movement mechanism 138, and drive mechanism 140 may each include any suitable mechanism for moving the respective components of the system 100 relative to each other. By way of example and not limitation, each of these mechanisms 134, 138, 140 may include a stepper motor, a servo motor, a pulley system, a gear train, a roller, a rack and pinion, a linear actuator, or any combination thereof.

The stop mechanism 142 may include any suitable mechanism for stopping the robotic arm 116 (e.g., a base of the robotic arm 116) relative to the track 114. By way of example and not limitation, the stop mechanism 142 may include a linear actuator (e.g., a pneumatic pin), a lever arm, a cam, a brake pad, or any combination thereof. In some examples, the track 114 may include engagement elements (e.g., holes, teeth, depressions, etc.) with which the stop mechanism 142 may engage to lock the robotic arm 116 in place, as desired.

The position sensor 144 may include any suitable sensor for determining the position of the robotic arm 116. By way of example and not limitation, the position sensor 144 may include an optical sensor (e.g., a laser emitter and sensor, an area scanner, an infrared emitter and sensor, a visible light sensor, etc.), a Hall effect sensor, a proximity switch, an encoder, or any combination thereof.

As noted above, the robotic arm 116 may be configured to retrieve and position SIPs 118 to construct at least a portion of a building. FIG. 2 is a perspective view of an SIP 200, according to at least one embodiment of the present disclosure. The SIP 200 may include a first panel 202, a second panel 204, and an insulation material 206 positioned between the first panel 202 and the second panel 204.

The first and second panels 202, 204 may be or include any rigid plate material. By way of example and not limitation, the first and second panels 202, 204 may each include a wood material (e.g., plywood, oriented strand board, solid wood plank, etc.), a hard-plastic material, cement material, ceramic material, a metal material, or a composite material. The insulation material 206 may include a rigid insulation material, such as a foam material (e.g., polystyrene foam, polyisocyanurate foam, polyurethane foam, etc.) or a honeycomb material. Some SIPs 200 may also include a window 208 or door coupled to the first and/or second panels 202, 204. The SIPs 200 may be provided in a variety of sizes, such as to accommodate different designs or purposes. The SIPs 200 may be painted, stained, encased, or otherwise at least partially covered by a surface finish. In some examples, the SIPs 200 may include an engagement feature 210, which may be an element with which the end effector of the robotic arm 116 may engage to lift and maneuver the SIPs 200.

FIG. 3 is a plan view of a system 300 for automated building construction in an initial stage (e.g., a home position), according to at least one embodiment of the present disclosure. In some respects, the system 300 shown in FIG. 3 is similar to the system 100 described above with reference to FIG. 1. For example, the system 300 may include upright supports 302 positioned adjacent to a construction site 304. Support platforms 306 may extend between the upright supports 302. A bridge platform 308 may be coupled to and horizontally movable along the support platforms 306. A cross platform 312 may also be coupled to the support platforms 306.

A track 314 may be mounted to at least the bridge platform 308. For example, a first track segment 314A may be mounted to the bridge platform 308, a second track segment 314B may be mounted to a first support platform 306A, a third track segment 314C may be mounted to the cross platform 312, and a fourth track segment 314D may be mounted to a second support platform 306B. A robotic arm 316 may be coupled to and movable along the track 314. The robotic arm 316 may be configured to retrieve SIPs 318 (e.g., from a stack 320 of SIPs 318) and to position the SIPs 318 to construct at least a portion of a building in the construction site 304.

The system 300 may also include a lifting mechanism 334 configured to vertically move the support platforms 306 along the upright supports 302, a bridge movement mechanism 338 configured to horizontally move the bridge platform 308 along the support platforms 306, and a drive mechanism 340 configured to move the robotic arm 316 (e.g., a base of the robotic arm 316) along the track 314.

As shown in FIG. 3, the support platforms 306 may each be formed of support platform segments 307A, 307B that are coupled to each other in an end-to-end fashion. Each of the support platform segments 307A, 307B may have a length that may facilitate transportation and assembly of the system 300. By way of example and not limitation, each of the support platform segments 307A, 307B may have a length between about 5 feet and about 20 feet (e.g., between about 8 feet and about 10 feet).

The track 314 may be positioned along an inner portion (e.g., at least partially within an outer periphery of the system 300 defined by the upright supports 302) of the support platforms 306, bridge platform 308, and cross platform 312 to facilitate constructing a building inside of these platforms 306, 308, 312. Accordingly, the robotic arm 316 may also be supported on the inner portion of the platforms 306, 308, 312 as the robotic arm 316 moves along the track 314.

Some building materials 325 for retrieval by the robotic arm 316 may be located on the bridge platform 308 (as shown in FIG. 3), on the support platforms 306, and/or on the cross platform 312. For example, fasteners (e.g., bolts, screws, or nails), brackets, structural supports, and/or other building materials may be positioned on one or more of the platforms 306, 308, 312 for efficient retrieval by the robotic arm 316 as needed, without necessarily returning the robotic arm 316 and the bridge platform 308 to the home position.

FIG. 3 illustrates the system 300 in an initial, home position in which the bridge platform 308 is located at an end of the support platforms 306. In this state, the first track segment 314A on the bridge platform 308 may be aligned with the second track segment 314B and the fourth track segment 314D, such that the robotic arm 316 (e.g., a base of the robotic arm 316) may move from the first track segment 314A to either the second track segment 314B or the fourth track segment 314D. In some embodiments, an alignment mechanism 346 may be configured to align the first track segment 314A with the second track segment 314B and/or with the fourth track segment 314D. For example, the alignment mechanism 346 may include a sensor configured to sense when the first track segment 314A is aligned with the second track segment 314B and/or with the fourth track segment 314D. The alignment mechanism 346 may also include a lock configured to lock the bridge platform 308 in position relative to the support platforms 306.

FIG. 4 is a plan view of the system 300 of FIG. 3 in a first active (e.g., constructing) position, according to at least one embodiment of the present disclosure. As shown in FIG. 4, in the first active position, the robotic arm 316 has already positioned several SIPs 318 to begin construction of a building 348. The robotic arm 316 has retrieved another SIP 318 from the stack 320 of SIPs 318. The robotic arm 316 is located on the bridge platform 308 to place the SIP 318 in an appropriate position. The bridge platform 308 has been horizontally moved along the support platforms 306 into a position where the robotic arm 316 can reach the appropriate location for placing the SIP 318.

FIG. 5 is a plan view of the system of FIG. 3 in a second active (e.g., constructing) position, according to at least one embodiment of the present disclosure. As shown in FIG. 5, the robotic arm 316 has already positioned several SIPs 318 to begin construction of the building 348. The robotic arm 316 has retrieved another SIP 318 from the stack 320 of SIPs 318 and has been moved along the track 314 to be positioned on one of the support platforms 306. Positioning the robotic arm 316 on the support platform 306 may facilitate reaching an appropriate location for positioning the SIP 318 and orienting the SIP 318 for proper positioning.

FIG. 6 is a flow diagram illustrating a method 600 of automated building construction, according to at least one embodiment of the present disclosure. At operation 610, upright supports may be positioned adjacent to a construction site. Operation 610 may be performed in a variety of ways. For example, the upright supports may be rolled (e.g., with wheels attached to the upright supports) into position and secured in their respective locations, such as via an outrigger. In some embodiments, multiple upright support segments may be coupled to each other end-to-end to increase a height of each of the upright supports.

At operation 620, at least one support platform may be coupled to the upright supports. The at least one support platform may be vertically movable along the upright supports. Operation 620 may be performed in a variety of ways. For example, two support platforms may be coupled to the upright supports via lift rails. A lifting mechanism (e.g., a motor, a pulley system, a rack and pinion, etc.) may be configured to lift the support platforms along the upright supports.

At operation 630, a bridge platform may be coupled to the at least one support platform such that the bridge platform is horizontally movable relative to the support platform(s). Operation 630 may be performed in a variety of ways. For example, the bridge platform may be mounted to one or more guiderails of the support platform(s). A bridge movement mechanism may be configured to horizontally move the bridge platform along the support platform(s).

At operation 640, a robotic arm (e.g., a six-axis robotic arm) may be mounted to a track supported by the bridge platform. The robotic arm may be movable along the track. Operation 640 may be performed in a variety of ways. For example, the track may be supported on a top, side, or bottom of the bridge platform. A drive mechanism may be configured to move the robotic arm along the track into various positions for constructing a building (e.g., retrieving SIPs and positioning the SIPs in desired locations).

At operation 650, structural insulated panels may be positioned at the construction site with the robotic arm to construct at least a portion of the building. Operation 650 may be performed in a variety of ways. For example, the robotic arm may be moved into a position along the track adjacent to a stack of SIPs, and an end effector of the robotic arm may lift (e.g., grasp, suction, magnetically lift, etc.) an SIP from the stack. Then, the robotic arm, as it is holding the SIP, may be moved into an appropriate location to place the SIP. The robotic arm may then orient and position the SIP in the appropriate location to construct a feature (e.g., a portion of a wall, a window, a door, etc.) of the building.

Accordingly, the present disclosure includes systems and methods for automated building construction that may include a support platform and a bridge platform that are vertically movable relative to upright supports. The bridge platform may be horizontally movable relative to the support platform. A robotic arm may be mounted on the bridge platform and movable along a track, which may be supported by the bridge platform and optionally the support platform. The robotic arm may be configured for retrieving and positioning structural insulated panels to construct a building. This system may be modular and easy to assemble and use for various construction projects.

The following example embodiments are also included in the present disclosure.

Example 1: A system for automated building construction, which may include: upright supports; a support platform coupled to the upright supports and configured to move vertically along the upright supports; a bridge platform coupled to the support platform and configured to move horizontally along the support platform; a track mounted on the bridge platform; and a robotic arm coupled to and movable along the track, wherein the robotic arm is configured to retrieve structural insulated panels and to position the structural insulated panels to construct at least a portion of a building.

Example 2: The system of Example 1, wherein the upright supports comprise wheels for moving the upright supports into a position for constructing the building.

Example 3: The system of Example 1 or Example 2, wherein the upright supports comprise four upright supports.

Example 4: The system of any of Examples 1 through 3, wherein the track is further mounted on the support platform.

Example 5: The system of any of Examples 1 through 4, wherein the track comprises a first track segment mounted on the bridge platform and a second track segment mounted on the support platform, wherein the first track segment and the second track segment are configured to be aligned with each other when the bridge platform is in a home position.

Example 6: The system of any of Examples 1 through 5, wherein at least a portion of the track is positioned inside an outer periphery defined by the upright supports.

Example 7: The system of any of Examples 1 through 6, wherein the robotic arm comprises a six-axis robotic arm.

Example 8: The system of any of Examples 1 through 7, wherein the bridge platform comprises at least one bridge truss beam.

Example 9: The system of any of Examples 1 through 8, wherein the support platform comprises at least one support truss beam.

Example 10: The system of any of Examples 1 through 9, wherein each of the upright supports comprises at least one upright truss beam.

Example 11: The system of any of Examples 1 through 10, wherein the support platform comprises at least two support platform segments coupled to each other end-to-end.

Example 12: The system of any of Examples 1 through 11, further comprising a drive mechanism configured to move the robotic arm along the track.

Example 13: The system of any of Examples 1 through 12, further comprising a stop mechanism configured to lock the robotic arm in position along the track.

Example 14: The system of any of Examples 1 through 13, further comprising a lifting mechanism configured to vertically move the support platform along the upright supports.

Example 15: The system of any of Examples 1 through 14, further comprising a bridge movement mechanism configured to horizontally move the bridge platform along the support platform.

Example 16: The system of any of Examples 1 through 15, further comprising at least one position sensor configured to identify a location of the robotic arm relative to at least one of: the bridge platform or the support platform.

Example 17: A method of constructing a building, which may include: positioning upright supports adjacent to a construction site; coupling at least one support platform to the upright supports such that the at least one support platform is vertically movable relative to the upright supports; coupling a bridge platform to the at least one support platform such that the bridge platform is horizontally movable relative to the at least one support platform; mounting a robotic arm to a track supported by the bridge platform such that the robotic arm is movable along the track; and positioning, with the robotic arm, structural insulated panels at the construction site to construct at least a portion of the building.

Example 18: The method of Example 17, further comprising moving the robotic arm along the track to retrieve the structural insulated panels.

Example 19: The method of Example 17 or 18, wherein coupling the at least one support platform to the upright supports comprises coupling at least two support platforms to the upright supports.

Example 20: The method of any of examples 17 through 19, wherein positioning the upright supports adjacent to the construction site comprises: rolling the upright supports with wheels to the location adjacent to the construction site; and deploying outriggers between the upright supports and a ground surface.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of constructing a building, comprising:
   positioning upright supports adjacent to a construction site;
   coupling at least one support platform to the upright supports such that the at least one support platform is vertically movable relative to the upright supports;
   coupling a bridge platform to the at least one support platform such that the bridge platform is horizontally movable relative to the at least one support platform;
   mounting a robotic arm to a track supported by the bridge platform such that the robotic arm is movable along the track;
   positioning, with the robotic arm, structural insulated panels at the construction site to construct at least a portion of the building; and
   mounting the track on the at least one support platform, wherein the track comprises a first track segment mounted on the bridge platform and a second track segment mounted on the at least one support platform, wherein the first track segment and the second track segment are configured to be aligned with each other when the bridge platform is in a home position.

2. The method of claim 1, further comprising moving the robotic arm along the track to retrieve the structural insulated panels.

3. The method of claim 1, wherein coupling the at least one support platform to the upright supports comprises coupling at least two support platforms to the upright supports.

4. The method of claim 1, wherein positioning the upright supports adjacent to the construction site comprises:
   rolling the upright supports with wheels to a location adjacent to the construction site; and
   deploying outriggers between the upright supports and a ground surface.

5. The method of claim 1, wherein the upright supports comprise wheels for moving the upright supports into a position for constructing the building.

6. The method of claim 1, wherein the upright supports comprise four upright supports.

7. The method of claim 1, wherein at least a portion of the track is positioned inside an outer periphery defined by the upright supports.

8. The method of claim 1, wherein the robotic arm comprises a six-axis robotic arm.

9. The method of claim 1, wherein the bridge platform comprises at least one bridge truss beam.

10. The method of claim 1, wherein the support platform comprises at least one support truss beam.

11. The method of claim 1, wherein each of the upright supports comprises at least one upright truss beam.

12. The method of claim 1, wherein the support platform comprises at least two support platform segments coupled to each other end-to-end.

13. The method of claim 1, further comprising providing a drive mechanism configured to move the robotic arm along the track.

14. The method of claim 1, further comprising providing a stop mechanism configured to lock the robotic arm in position along the track.

15. The method of claim 1, further comprising providing a lifting mechanism configured to vertically move the support platform along the upright supports.

16. The method of claim 1, further comprising providing a bridge movement mechanism configured to horizontally move the bridge platform along the support platform.

17. The method of claim 1, further comprising providing at least one position sensor configured to identify a location of the robotic arm relative to at least one of: the bridge platform or the support platform.

* * * * *